(12) United States Patent
Qi

(10) Patent No.: US 9,709,821 B2
(45) Date of Patent: Jul. 18, 2017

(54) SPECTACLE LENS AND METHOD FOR DESIGNING THE SAME, METHOD FOR MANUFACTURING SPECTACLE LENS, AND PROGRAM

(71) Applicant: HOYA CORPORATION, Tokyo (JP)

(72) Inventor: Hua Qi, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 79 days.

(21) Appl. No.: 14/413,886

(22) PCT Filed: Jul. 8, 2013

(86) PCT No.: PCT/JP2013/068592
§ 371 (c)(1),
(2) Date: Jan. 9, 2015

(87) PCT Pub. No.: WO2014/010539
PCT Pub. Date: Jan. 16, 2014

(65) Prior Publication Data
US 2015/0212338 A1 Jul. 30, 2015

(30) Foreign Application Priority Data

Jul. 9, 2012 (JP) .................. 2012-153601

(51) Int. Cl.
*G02C 7/00* (2006.01)
*G02C 7/02* (2006.01)
*G02C 7/06* (2006.01)

(52) U.S. Cl.
CPC ............. *G02C 7/028* (2013.01); *G02C 7/025* (2013.01); *G02C 7/061* (2013.01); *G02C 7/063* (2013.01)

(58) Field of Classification Search
CPC ......... G02C 7/061; G02C 7/065; G02C 7/063
(Continued)

(56) References Cited

U.S. PATENT DOCUMENTS

2011/0211159 A1 9/2011 Suzuki
2011/0222019 A1 9/2011 Suzuki et al.

FOREIGN PATENT DOCUMENTS

EP  2 367 048 A1  9/2011
EP  2367048 A1 *  9/2011
(Continued)

OTHER PUBLICATIONS

Jan. 13, 2015 International Preliminary Report on Patentability issued in International Application No. PCT/JP2013/068592.
(Continued)

*Primary Examiner* — James Greece
(74) *Attorney, Agent, or Firm* — Oliff PLC

(57) ABSTRACT

A spectacle lens, which is a pair of spectacle lenses including a lens for a left eye and a lens for a right eye corresponding to left and right eyes respectively, wherein a lens power is set so that accommodation powers coincide with each other between right and left eyes, the accommodation powers being required for each of the right and left eyes calculated based on a distance between an arbitrary point on a virtual object surface and each of the right and left eyes, and the lens power at each passing point where an optical ray directed to this point passes through the lens for a left eye and the lens for a right eye, when the previously set arbitrary point on the virtual object surface is viewed in a binocular vision through the lens for a left eye and the lens for a right eye.

7 Claims, 8 Drawing Sheets

(58) Field of Classification Search
USPC .................. 351/159.42, 159.01, 159.41, 351/159.73–159.77
See application file for complete search history.

(56) References Cited

FOREIGN PATENT DOCUMENTS

| | | |
|---|---|---|
| EP | 2 392 961 A1 | 12/2011 |
| EP | 2 395 386 A1 | 12/2011 |
| JP | 2011-203705 A | 10/2011 |
| JP | 2012-022288 A | 2/2012 |
| WO | 03/048841 A1 | 6/2003 |
| WO | 2009/072528 A1 | 6/2009 |

OTHER PUBLICATIONS

Oct. 8, 2013 International Search Report issued in International Application No. PCT/JP2013/068592.
Feb. 19, 2016 Extended Search Report issued in European Patent Application No. 13817378.6.

* cited by examiner

LENS SURFACE CORRESPONDING AT MEDIAN POSITION
OF OBJECT SURFACE, NAMELY ACTUAL CORRIDOR
PRESCRIPTION R: S3.00C-1.50Ax 170L;S2.00C - 1.00Ax10
Add 2.50
CORRIDOR 14mm

SPECTACLE LENS AND METHOD FOR DESIGNING THE SAME, METHOD FOR MANUFACTURING SPECTACLE LENS, AND PROGRAM

TECHNICAL FIELD

The present invention relates to a pair of spectacle lenses including a lens for a right eye and a lens for a left eye corresponding to the right and left eyes respectively, a method for designing the same, a method for manufacturing a spectacle lens, and a program.

DESCRIPTION OF THE RELATED ART

There are various kinds of spectacle lenses, and a progressive addition lens is known as one of them. The progressive addition lens is formed so that "a distance vision zone" for far-sighted view, and "a near vision zone" for near-sighted view, and "an intermediate (progressive) zone" in which the power is progressively varied between the distance vision zone and the near vision zone, are arranged in one lens.

Regarding such a progressive addition lens, when a power distribution is designed on the lens, variation of powers is imparted to the progressive addition lens according to a specific power variation curve, from the distance vision zone at an upper side of the lens toward the near vision zone at a lower side of the lens in a using state of the lens. Then, regarding the power distribution in a horizontal direction (right and left direction) in the using state of the lens, it is general to make the power varied so as to suppress astigmatism while securing a required wideness of a visual field. More specifically, for example in the near vision zone, horizontal power distribution is set so as to gradually decrease toward the both sides, with a near vision passing point at a peak on the corridor. Although powers of the right and left lenses are decreased at the same ratio basically, power at the nose side can be relatively speedily decreased and power at the ear side can be relatively slowly decreased in relation to inset. In any case, the both sides of the shape of the corridor is designed based on a single lens, in consideration of suppressing astigmatism, suppressing swing due to a sudden change of the power, and suppressing a distortion.

Incidentally, the spectacle lens is used by a pair of lenses corresponding to right and left eyes respectively in almost all cases. That is to say, in almost all cases, a lens wearer views an object that exists in a visual field of the lens wearer in binocular vision, through the lens for left eye and the lens for right eye.

As the progressive addition lens designed in consideration of the binocular vision by the lens wearer when the distance power is different between right and left, there is the pair of progressive addition lenses that right lens and left lens is assigned different average power distribution and astigmatism distribution respectively, so as to suppress the generation of aberrations other than right and left distance power difference, to thereby reduce the inconvenience of the binocular vision function caused by the power difference between right and left (see patent document 1 for example).

PRIOR ART DOCUMENT

Patent Document

Patent document 1: International Publication No. 2009/072528

SUMMARY OF THE INVENTION

Problem to be Solved by the Invention

The abovementioned conventional progressive addition lens, including the progressive addition lens disclosed in patent document 1, is designed in view of suppressing its astigmatism. Therefore, the conventional progressive addition lens is not necessarily suitable for the binocular vision for the reason described below.

Regarding the binocular vision by right and left eyes, right and left eyes are governed by the same innervation based on the Hering's Law of equal innervation. That means, when the object is viewed in binocular vision, right and left eyeballs always view the object with the same accommodation power.

However, according to a conventional lens design, emphasis is put on the point of suppressing the astigmatism or balance of an average power and the astigmatism of the lens itself, and it is not taken into consideration that both of the right and left eyes view an object with the same accommodation power. Accordingly, in the case of the conventional lens design, when the lens wearer views an object in binocular vision through the spectacle lens based on the conventional lens design, there is a possibility that both eyes cannot obtain clear retina image simultaneously, and then the lens wearer feels discomfort or eye strain in some of these cases. Thus, the conventional progressive addition lens is not necessarily suitable for the binocular vision.

Therefore, an objective of the present invention is to provide a pair of ophthalmic lenses capable of reducing an inconvenience of binocular vision function of the lens wearer when viewing an object in binocular vision by the right and left eyes, and a method for designing the same, a method for manufacturing the same, and a program.

Means for Solving the Problem

In order to achieve the above-described object, the present invention is provided.

According to a first aspect of the present invention, there is provided a spectacle lens, which is a pair of spectacle lenses including a lens for the left eye and a lens for the right eye corresponding to left and right eyes respectively, wherein each lens powers are set so that accommodation powers being required for each of the right and left eyes coincide with each other when an arbitrary point on the previously set virtual object surface is watched binocularly through each lenses for each eye. Wherein the accommodation power being required for each of the right and left eyes is calculated based on the distance from the eye to that arbitrary point on the virtual object surface, and the lens power at the passing point where the optical ray from that arbitrary point towards the eye passes through.

According to a second aspect of the present invention, there is provided the spectacle lens of the first aspect, wherein the lens for a left eye and the lens for a right eye are progressive addition lenses.

According to a third aspect of the present invention, there is provided the spectacle lens of the second aspect, wherein regarding all corresponding points in at least a range of upper side 10 mm to lower side 15 mm from a lens hidden mark position, and in a rage of right and left 10 mm from a corridor, a difference between the accommodation powers required for each of the right and left eyes, is 0.05 D or less.

According to a fourth aspect of the present invention, there is provided the spectacle lens of the second or third aspect, wherein regarding a horizontal variation of the lens power on a lens in at least a near portion to an intermediate portion, the lens power is set so as to be monotonically decreased toward a nose side from a point on a corridor, and be increased once and thereafter decreased toward an ear side from the point on the corridor.

According to a fifth aspect of the present invention, there is provided a method for designing a spectacle lens, which is the method for designing a pair of spectacle lenses including a lens for the right eye and a lens for the left eye corresponding to right and left eyes respectively, including:

setting a virtual object surface in a visual field viewed through the lens for a left eye and the lens for a right eye;

calculating the accommodation power required for each right and left eyes respectively when an arbitrary point on the previously set virtual object surface is watched binocularly through each lens for each eye, based on the distance between that arbitrary point on a virtual object surface and each of the right and left eyes, and the lens power at each passing point where the optical ray from that arbitrary point towards the eye passes through; and correcting the lens power in at least one of the lens for left eye and the lens for right eye so that the calculated accommodation powers coincide with each other between right and left eyes.

According to a sixth aspect of the present invention, there is provided a method for manufacturing a spectacle lens, which is the method for manufacturing a pair of spectacle lenses including a lens for a right eye and a lens for a left eye corresponding to right and left eyes respectively, including:

designing the lens for a left eye and the lens for a right eye; and manufacturing the lens for a left eye and the lens for a right eye based on a design content used in designing the lens, the designing the lens further includes:

setting a virtual object surface in a visual field viewed through the lens for a left eye and the lens for a right eye;

calculating the accommodation power required for each right and left eyes respectively when an arbitrary point on the previously set virtual object surface is watched binocularly through each lens for each eye, based on the distance between that arbitrary point on a virtual object surface and each of the right and left eyes, and the lens power at each passing point where the optical ray from that arbitrary point towards the eye passes through; and correcting the lens power in at least one of the lens for left eye and the lens for right eye so that the calculated accommodation powers coincide with each other between right and left eyes.

According to a seventh aspect of the present invention, there is provided a program, which is configured to cause a computer used for designing a pair of spectacle lenses including a lens for a right eye and a lens for a left eye corresponding to right and left eyes respectively, to function as a unit for setting a virtual object surface in a visual field viewed through the lens for a left eye and the lens for a right eye; a unit for calculating the accommodation power required for each right and left eyes respectively when an arbitrary point on the previously set virtual object surface is watched binocularly through each lens for each eye, based on the distance between that arbitrary point on a virtual object surface and each of the right and left eyes, and the lens power at each passing point where the optical ray from that arbitrary point towards the eye passes through; and a unit for correcting the lens power in at least one of the lens for left eye and the lens for right eye so that the calculated accommodation powers coincide with each other between right and left eyes.

Advantage of the Invention

According to the present invention, when an object is viewed in binocular vision by right and left eyes, inconvenience caused to a binocular vision function of a lens wearer, can be reduced.

DETAILED DESCRIPTION OF THE INVENTION

Figure 1:
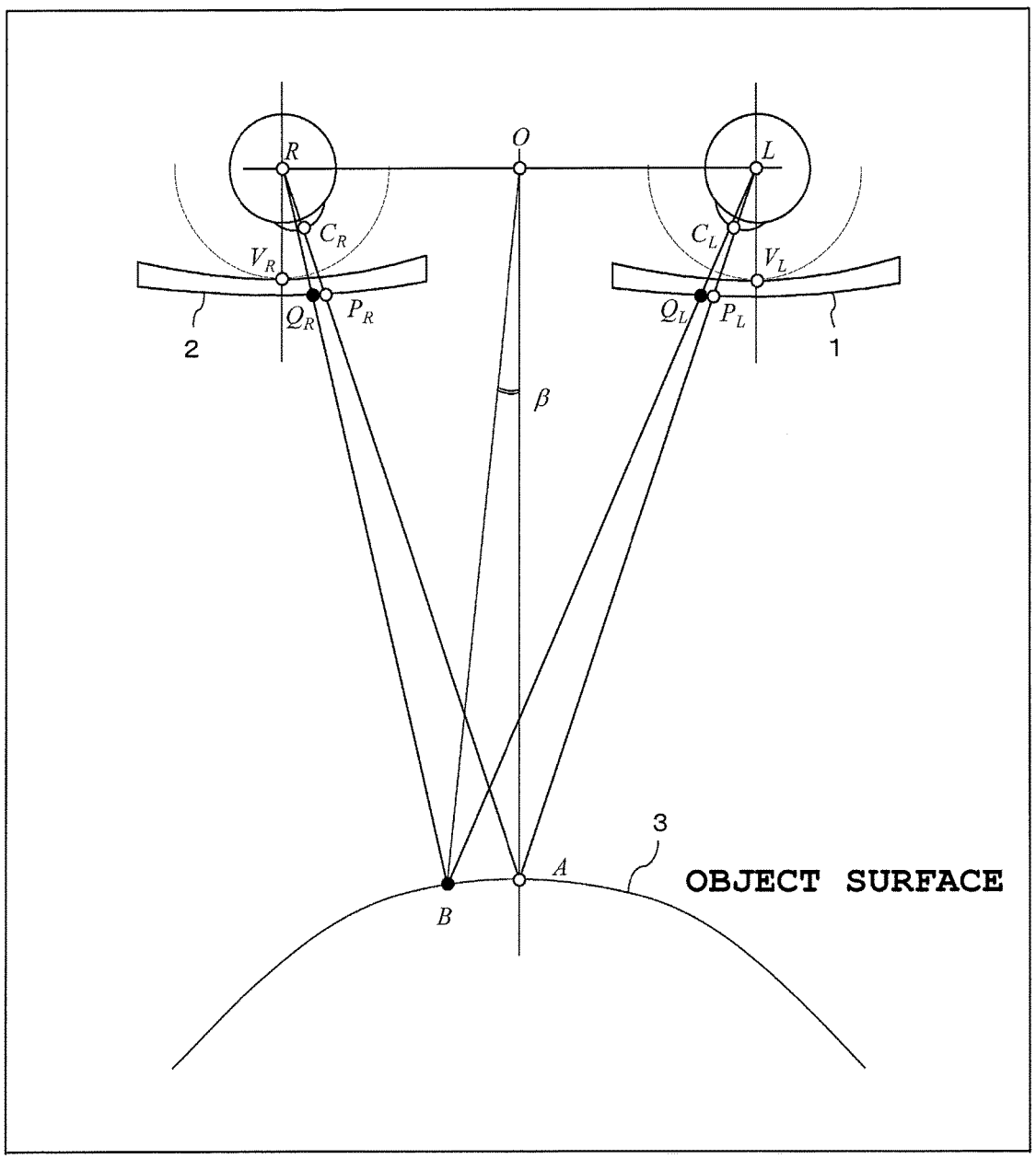
FIG. 1 is a top view showing optical rays of the right and left eyes respectively when viewing an object point binocularly.

Embodiments of the present invention will be described hereafter, based on the drawings.

This embodiment is itemized in the following order and explanation is given for each of them.
1. Outline of the binocular vision
2. Procedure of a lens design
2-1. Object surface setting step
2-2. Corridor specifying step
2-3. accommodation power calculating step
2-4. Power correcting step
2-5. Tool used for the lens design
3. Manufacturing procedure of the spectacle lens
4. Structure of the spectacle lens
5. Effect of this embodiment
6. Modified example, etc.

1. Outline of the Binocular Vision

Here, detailed explanation is given with reference to FIG. 1, for a problem that occurs when an object is viewed in binocular vision by right and left eyes through a spectacle lens.

FIG. 1 is a top view showing optical ray of the right and left eyes respectively when viewing an object point binocularly. It shows the situation of viewing an object through a near vision zone of a progressive addition lens.

As already described above, according to the Hering's Law, both of the right and left eyes keep the same accommodation power when viewing an object binocularly. However, conventionally a lens is designed in consideration of a balance between astigmatism and an average power regarding each of the lens for right eye and the lens for left eye itself, without considering the cooperation with another lens, for example, power matching with another lens at all corresponding points. Accordingly, there may be a case that the accommodation power required for obtaining a focused retinal image is different between right and left eyes when viewing a specific object point. However, according to the Hering's Law, the accommodation power is always the same between right and left eyes, and therefore in this case, the focused retinal image cannot be obtained simultaneously by right and left eyes, thus involving a problem that the lens wearer feels discomfort or eye strain. Such a problem probably occurs not only in a case that a prescribed power is different between right and left eyes, but also in a case that the prescribed power is the same between right and left eyes.

FIG. 1 shows an example case that object in a surface 3 is viewed binocularly through the near vision area of progressive addition lens 1 for left eye and progressive addition lens 2 for right eye. $P_L$ and $P_R$ are the positions on lens 1 and 2 where optical rays from left eye and right eye respectively pass through when object point A is viewed binocularly through both lenses. Object point A on the object surface 3 locates at the median plane which is defined as a plane perpendicular to the straight line from the rotation center of right eye R to the rotation center of left L and pass through the midpoint O of R and L. Thus $P_L$ and $P_R$ are located on the corridor of each lens 1 and 2. Then, the refractive power of lens 1 and at $P_L$ and $P_R$ respectively are determined based on addition power prescribed for the lens wearer. If prescribed distance powers, corridors, and additions for right and left are matched with each other, the refractive power of lens 1 and 2 at $P_L$ and $P_R$ respectively are also the same. In this case, the accommodation power required for viewing point A is also the same between right and left.

However, if the prescribed distance power is different between right and left eyes, or positions of $P_L$ and $P_R$ are different due to prism prescription, lens refractive powers at $P_L$ and $P_R$ are different. As a result, the focused retinal image cannot be obtained simultaneously by both eyes. In this case, right and left mismatch can be solved by adjusting the length of the corridor and the position for starting addition, thereby setting the same accommodation powers required for the right and left eyes.

Wherein, if the lens wearer moves his (her) eyes to see point B on the object surface 3, position $Q_L$ and $Q_R$ on lens 1 and 2 where each optical ray passes through are deviated from the corridor of each lens 1, 2. However, the distances from each corridor to each passing points $Q_L$ and $Q_R$ are not necessarily the same. In the case that lens 1 and 2 are designed separately, refractive powers of $Q_L$ and $Q_R$ are independently determined in consideration of suppressing astigmatism of the lens itself. Accordingly, the refractive powers of $Q_L$ and $Q_R$ generally are not matched with each other.

Therefore, not only in the case that the prescribed distance powers are different, but also in the case that the prescribed distance powers are the same between right and left eyes, there is a possibility that the lens wearer feels uncomfortable or eye strain, depending on a direction of the optical ray.

Regarding this point, as a result of strenuous efforts by inventors of the present invention, it is found that optical properties in the case of the binocular vision can be improved by not designing the lenses for right and left eyes independently focusing on suppression of astigmatism as conventional, but simultaneously designing the lenses 1 and 2 for right and left eyes in consideration of the fact that the point on the object surface is viewed by both of the right and left eyes. Namely, an unconventional new knowledge is obtained as follows: each of the lenses 1 and 2 for right and left eyes is simultaneously designed, with these lenses considered to be a pair, and the lens powers are distributed so as to set the same accommodation powers required for right and left eyes in binocular vision.

Further, particularly in the case of the progressive addition lens, it is important to design the lens so as to suppress astigmatism. Regarding this point as well, strenuous efforts are made by the inventors of the present invention. Then, it is also found that the lens design in consideration of the binocular vision by right and left eyes, is preferably applied to at least a partial area on the lenses 1 and 2, without applying it to the whole area on the lenses 1 and 2. Namely, it is found that if the lens design in consideration of the binocular vision is applied to at least a partial area on the lenses 1 and 2, for example the lens design in consideration of suppressing astigmatism may be applied to other area, and thus a completely unconventional new knowledge can be obtained as follows: astigmatism can be suppressed while improving the optical properties in the binocular vision.

The method for designing a lens described in this embodiment, is performed based on the above-described new knowledge by the inventors of the present invention.

2. Procedure of the Lens Design

Next, a procedure of the method for designing a lens of this embodiment will be described, with reference to an example of a case that it is applied to the design of the progressive addition lens.

The method for designing a lens of this embodiment is the method for designing a pair of progressive addition lenses including a lens 1 for a left eye and a lens 2 for a right eye corresponding to each of the left and right eyes respectively, and the method includes an object surface setting step, a corridor specifying step, an accommodation power calculating step, a power correction step, and a processing range limiting step. Each step of them will be sequentially described hereafter.

(2-1. Object Surface Setting Step)

Figure 2:
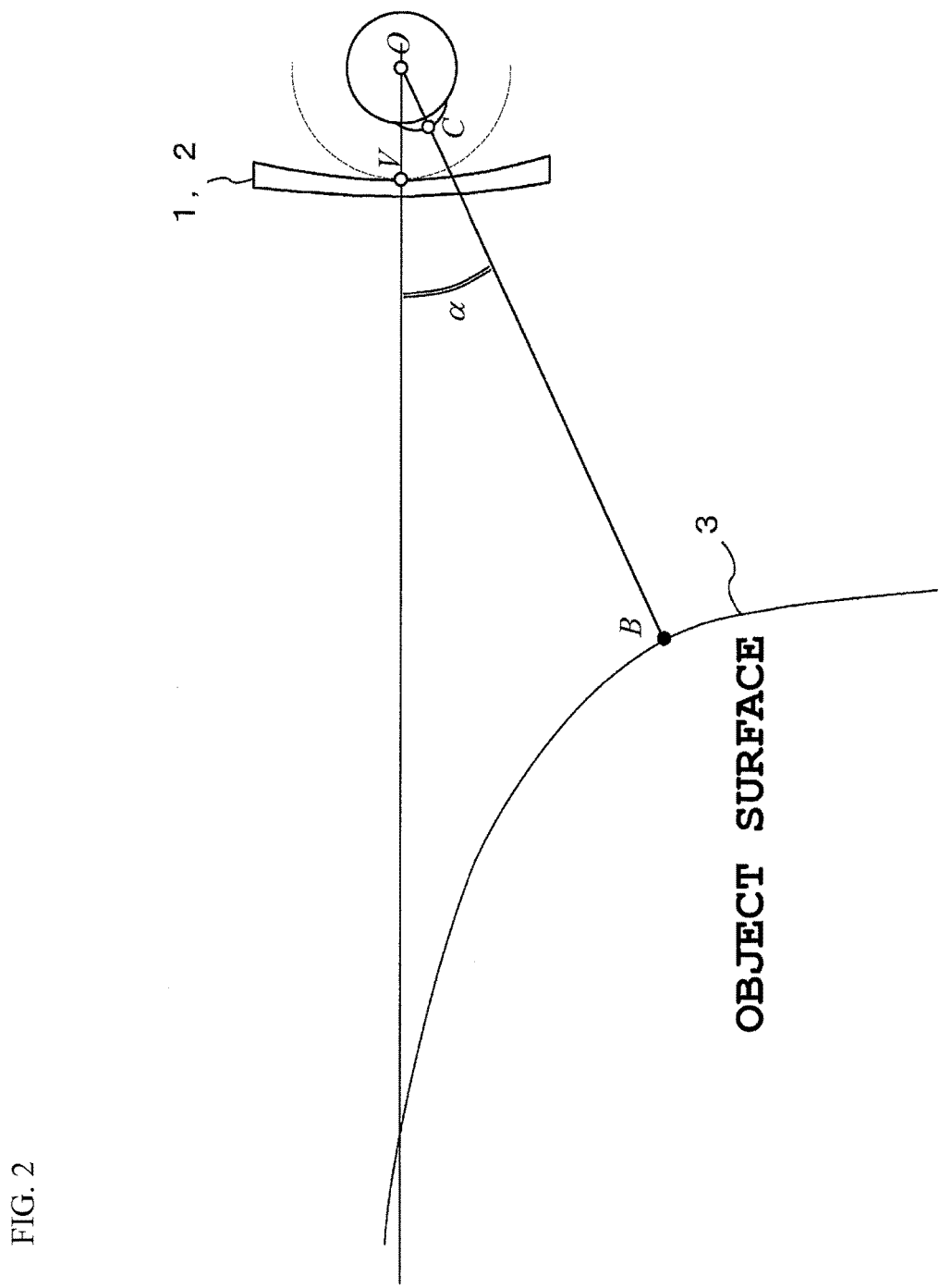
FIG. 2 is a side view of FIG. 1 situation showing a relation between an eyeball and optical ray.
Figure 3:
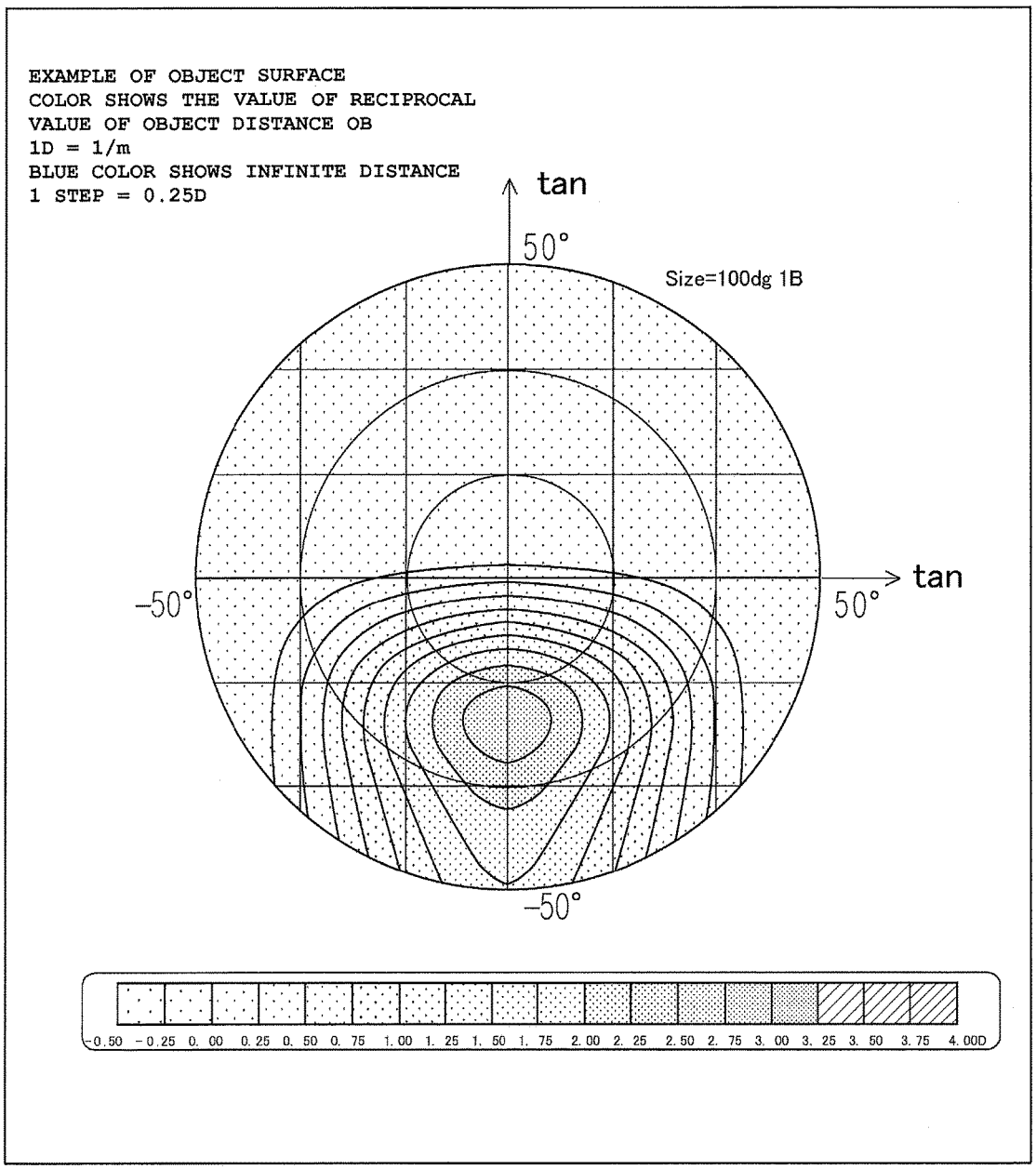
FIG. 3 is a distribution view showing the object distance distribution of an object surface shown in FIG. 1 and FIG. 2.

In the object surface setting step which is a first step, a virtual object surface 3 is set in a visual field viewed through the lens 1 for a left eye and the lens 2 for a right eye. The virtual object surface 3 may be set according to a previously specified setting reference. Specifically, it can be considered that a surface-shaped virtual object surface 3 is set as shown in FIG. 1 to FIG. 3.

For example, the horizontal shape of the object surface 3 is set as shown in FIG. 1.

First, point A is positioned on the median plane which is defined as a plane perpendicular to the straight line from the rotation center of right eye R to the rotation center of left L and pass through the midpoint O of R and L. The distance between the point A and the midpoint O (or distance between the point A and R, distance between the point A and L) is an infinite distance when the line of sight of the lens wearer passes through a distance vision zone on the lens, but it is a finite distance when the optical ray passes through a near vision zone. Then, in the case of the near vision zone, a so-called inset state is generated, in which the lens sight pass lines $P_L$ and $P_R$ are closer to a nose side. A specific size of the distance to point A, may be suitably set to fit a lens wearer's habit of using a spectacle based on the previously specified setting reference, and is not limited to a specific value.

Further, the horizontal shape of the object surface 3 shown in the figure, is set in an arc shape, so that the object distance from the R, O, L becomes large as the horizontal distance from the point A on the median plane becomes large (namely, as the distance is farther away from the point A). Specifically, the following case can be considered: namely, the surface shape is set in an arc shape so that when angle β of ∠BOA exceeds 45° for example regarding an arbitrary point B on the object surface 3, the object distance from O becomes infinite. However, this is simply a specific example of the surface shape, and the surface shape is not limited to a specific shape, if it is suitably set according to the previously specified setting reference.

Meanwhile, the vertical shape of the object surface is shown in FIG. 2. FIG. 2 is a side view of the situation shown in FIG. 1, shows the object position on the median plane.

When the line of sight of the lens wearer passes through a point in the distance vision zone on the lens (upper than eye point V), the distance between the point on the object surface 3 and midpoint O becomes infinite. Also, when the line of sight of the lens wearer moves to the arbitrary point B on the object surface 3 and the eyeball is turned by angle α of ∠BOV in the lower side, the line of sight of the lens wearer passes through the near vision zone on the lens, and the distance between the point B and the midpoint O becomes a finite distance. Note that the specific size of the angle α and the specific size of the distance to the point B, may be suitably set to fit the spectacle wearer's habit of using a spectacle based on the previously specified setting reference, and is not limited to a specific value.

In such an object surface 3, a part corresponding to an intermediate distance, exists between a part of the infinite distance corresponding to the distance vision zone, and a part of a finite distance corresponding to the near vision zone. Namely, the vertical surface shape in the median plane of the object surface 3, may correspond to an addition variation curve which is generally estimated when designing the progressive addition lens.

FIG. 3 shows an example of object distance distribution of an object surface in the visual field of the wearer shown in FIG. 1 and FIG. 2. Wherein vertical axis tan α and horizontal axis tan β are tangents of a vertical deflection angle α and a horizontal deflection angle β. Also, in the figure, concentration (brightness) in the area shown in the figure, is set to match a reciprocal value of an object distance OB. Specifically, a highest concentration point shows apart corresponding to an infinite distance, wherein 1 D (diopter)= 1/m, and 1 step of difference of concentration=0.25 D.

According to the example shown in the figure, when the set object surface 3 is viewed from the eyeball side of the lens wearer, it is found that in the set object surface 3, the point on the object surface 3 gradually approaches from the distance vision zone corresponding to the infinite distance, to the near vision zone in the lower side, and the point on the object surface 3 becomes a distant point gradually as it goes away in right and left directions.

(2-2. Corridor Specifying Step)

After setting the virtual object surface 3, subsequently a corridor specifying step which is a second step is performed. In the corridor specifying step, the corridor on the lens is specified in the progressive addition lens, and the variation of the lens power on the corridor is specified based on a prescription content.

Figure 4:
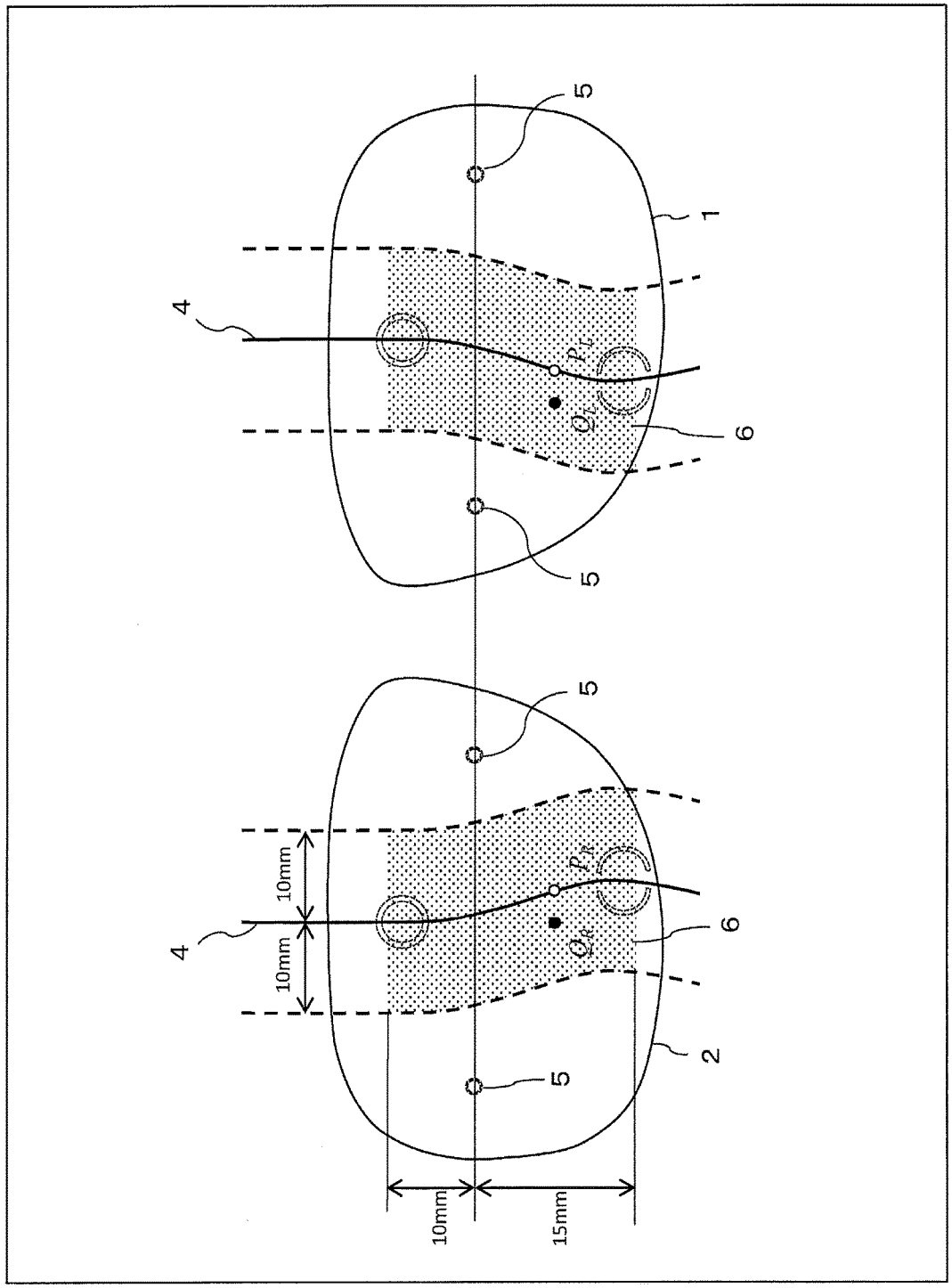
FIG. 4 is an explanatory view showing a corridor in a progressive addition lens corresponding to right and left eyes.

Here, the "corridor" means a locus of $P_L$ on lens 1 for a left eye and and $P_R$ on the lens 2 for a right from distance vision zone to near vision zone when viewing the object points on the median plane of the object surface 3, involving a variation (increase/decrease) of the lens power, and specifically the example is shown in FIG. 4.

FIG. 4 is an explanatory view showing the corridor in the progressive addition lens corresponding to right and left eyes.

As shown in the example of the figure, since the corridor 4 in the progressive addition lenses 1 and 2 is the locus of passing point when viewing the object points on the median plane of the object surface 3, in the near vision zone, the inset state is generated in which the corridor 4 is closer to the nose side. Regarding such a corridor 4, only by setting the object surface 3, positions on the lenses 1 and 2 can be specified by utilizing for example a ray tracing for each point on the median plane of the object surface 3.

When the position of the corridor 4 on the lenses 1 and 2 is specified, thereafter the variation of the lens power on the corridor 4 is specified. The lens power may be specified based on the prescription content for the lens wearer. Specifically, it can be considered that only by specifying the distance power, the addition, and the corridor, etc., as the prescription contents, the variation of the lens power on the corridor 4 can be specified based on these specification values.

However, the position on the corridor 4 and the variation of the lens power on the corridor 4 on the lenses 1 and 2, can be suitably set to fit the spectacle wearer's habit of using a spectacle. For example, the variation of the lens power on the corridor 4 is not previously determined only by the prescription content for the lens wearer, but can be set to match the variation of the distance on the median plane of the object surface 3 which is set to fit the spectacle wearer's habit of using a spectacle. Further, the position and the shape of the corridor 4 are also varied with the variation of the lens power. Specifically, even in a case of the corridor 4 on the same object surface 3, the following situation can be generated: (a) the corridor is long in the case of a plus lens, and reversely the corridor is short in the case of a minus lens, (b) an amount of inset in the near vision area can be varied depending on the variation of the lens power. Also, (c) the corridor 4 in the distance vision zone extends straight upward in the case of non-oblique astigmatism, but it extends so as to be tilted slightly in an oblique direction in the case of the oblique astigmatism. Also, (d) the corridor 4 is deviated from an original position in the case of a prism prescription.

Figure 5:
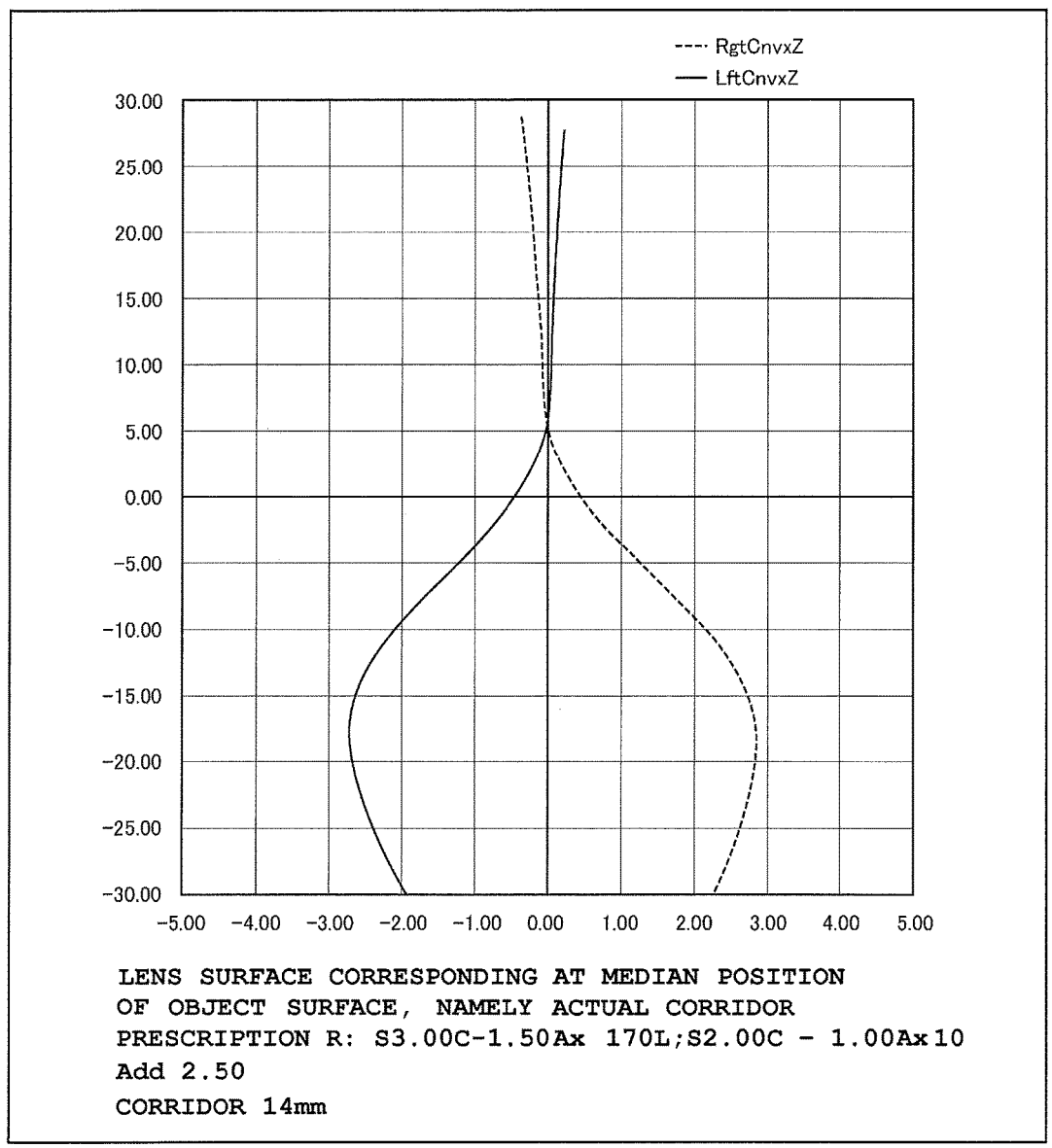
FIG. 5 is an explanatory view showing an actual corridor position on the lens.

FIG. 5 is an explanatory view showing the position of an actual corridor on the lens. The example of the figure shows a specific example of the position of the corridor 4 in the case of the oblique astigmatism (namely in the case of the abovementioned (c)). The prescription content is as follows. Right: S3.00C-1.50Ax 170, Left: S2.00C-1.00Ax 10, Addition Add2.50, and Corridor 14 mm.

According to the example of the figure, the corridor 4 in the distance vision zone extends so as to slightly be tilted in the oblique direction, and its tilt amount is different between right and left. Such a mode of the corridor 4 can be specified, depending on the spectacle wearer's habit of using a spectacle, etc.

(2-3. Accommodation Power Calculating Step)

After specifying the position of the corridor 4 on the lenses 1 and 2 and the variation of the lens power on the corridor 4, subsequently, the accommodation power calculating step which is a third step is performed. In the accommodation power calculating step, when an arbitrary point on the virtual object surface 3 is viewed in binocular vision through the lens 1 for a left eye and the lens 2 for a right eye, an accommodation power required for each of the right and left eyes is calculated based on the distance between this point and each of the right and left eyes, and the lens power at each passing point where the optical ray directed to this point passes through the lens 1 for a left eye and the lens 2 for a right eye.

The "required accommodation power" for each of the right and left eyes, means the accommodation power required for an imaging in a state of focusing on retinas of right and left eyeballs when the point on the object surface 3 is viewed through the lenses 1 and 2, and specifically defined as the following (A) or (B).

(A) is defined as follows in a backside vertex spherical surface:

> Required accommodation power=distance average power−average curvature of an object point wave front (A)

Regarding the power of the spectacle lens, an input wave front on the plane is refracted by the lens, to have a curvature equal to the curvature of an emission wave front at a backside vertex. In the case of an astigmatic prescription, although the curvature of the emission wave front is varied depending on a direction of a main sectional face, a maximum curvature and a minimum curvature correspond to a maximum power and a minimum power respectively. When an incident light enters the eyeball through the lens backside vertex position as a wave front having a curvature of a distance power value, an image is formed so as to be focused on a retina. When the incident light as a wave front having a smaller curvature enters the eyeball (for example, when the object approaches the eye, namely, when the curvature of the incident wave front is minus, or when the power of the lens is weak, or in the case of a synergy of an object distance and the lens power), the eyeball tries to form the image on the retina by strengthening its power. This is called an accommodation. An amount of the accommodation can be calculated by the abovementioned formula (A).

The object point wave front means the wave front formed at a ray position on the backside vertex spherical surface by refraction of the spherical wave front by the lens, with the object point as a center (plane wave front in the case of the infinite distance). The curvature of the object point wave front can be obtained by ray tracing.

The distance average power is spherical power S+half of astigmatic power C.

Meanwhile, the curvature of the object point wave front of formula (A) can approach a value obtained by subtracting a reciprocal of the object distance, from the power of the lens at the passing point. The power of the lens at the passing point called here, is the curvature of the wave front on the backside vertex spherical surface by enter of the incident wave front into the plane. The object distance is the distance from the object point to the lens backside vertex spherical surface. Accordingly, it can be considered that the required accommodation power is approximated to the following formula (A').

> Required accommodation power≈distance average power−average power at passing point+object distance reciprocal (A')

In formula (A'), it can be considered that (average power at the passing point−distance average power) is an average addition power at the passing point. Accordingly, formula (A') can be replaced with:

> Required accommodation power≈object distance reciprocal−average addition power at passing point (A").

(B) is defined as follows in a corneal apex:

> Required accommodation power=average curvature of a corneal distance wave front−average curvature of the object point wave front (B).

As described above, the input wave front through the plane is refracted by the lens having a specific distance power, and the curvature of the emission wave front at the backside vertex point is equal to the distance power of the lens. The wave front is further propagated, and when it reaches the corneal apex which is separated by a vertex distance, the curvature is varied slightly as follows.

$$S'=S/(1-dS)$$

In the case of the astigmatic prescription, the curvature of the wave front is calculated by substituting the maximum power and the minimum power in the abovementioned formula. The curvature of the wave front thus calculated is the curvature of the corneal distance wave front.

The above definition is established by calculating the required accommodation power by the wave front at the corneal vertex. Namely, the image is formed so as to be focused on the retina as it is, when the incident light enters the eyeball through the corneal vertex position, as the wave front having the curvature of the corneal wave front average curvature value. When the incident light enters the eyeball as a wave front having a smaller curvature (for example, when the object approaches the eye, namely, when the curvature of the incident wave front is minus, or when the power of the lens is weak, or in a case of a synergy of an object distance and the lens power), the eyeball tries to form the image on the retina by strengthening its power. This is called an accommodation. An amount of the accommodation can be calculated by the abovementioned formula (B). The object point wave front is the wave front formed at a ray position on the backside vertex spherical surface by refraction of the spherical wave front by the lens, with the object point as a center. The curvature of the object point wave front can be obtained by ray tracing.

The definition of (B) is established at the corneal vertex position which has no relation with the spectacle lens, and therefore it is logical. Meanwhile, the power of the lens is determined based on the backside vertex, and therefore the definition of (A) is convenient. Difference between both definitions is remarkable when an absolute value of the distance power is large, but is not so large as a value. An example given here is based on the definition (A).

Here, calculation of the required accommodation power will be described based on a specific example. Explanation is given here for the calculation of the accommodation power through each of the lenses 1 and 2, with the lens 1 for a left eye and the lens 2 for a right eye as examples, which are obtained by the lens design without considering the binocular vision as conventional. In the lens design not considering the binocular vision, the variation of the lens power in the horizontal direction (right and left direction) in a near vision zone and an intermediate (progressive) zone is set so that the lens power is decreased toward both sides of the corridor 4, with a position on the corridor 4 as a peak generally.

In the lens 1 for a left eye and the lens 2 for a right eye based on the conventional lens design, a binocular vision state is not taken into consideration, and therefore when the same point on the object surface 3 is viewed in the binocular vision, the accommodation power of each of the right and left eyes is different from each other in some cases.

For example, when the prescribed power is different between right and left eyes, the accommodation power required for each of the right and left eyes can be different from each other, even if the passing point of optical ray is positioned on the corridor 4.

Further, even when the prescribed power is matched with each other between right and left eyes, the accommodation power required for each of the right and left eyes can be different from each other when the position of the corridor 4 is different between right and left, for example as shown in FIG. 5.

Further, when the passing points of optical ray $Q_L$ and $Q_R$ are positioned at a place other than the corridor 4 for example as shown in FIG. 1, irrespective of whether or not the prescribed power is different between right and left eyes, the distance from the corridor 4 to the each passing point of optical ray $Q_L$ and $Q_R$ is not the same between right and left eyes, and the distance between a point of gaze on the object surface 3 and the eyeball of the lens wearer is also different between right and left eyes. Therefore, even when the same point on the object surface 3 is viewed, positions of the corresponding points to the passing point of optical ray $Q_L$ and $Q_R$ on the lens (called "corresponding points on the lens" hereafter) are not matched with each other between the lens 1 for a left eye and the lens 2 for a right eye, and as a result, the accommodation power required for each of the right and left eyes can be different from each other.

Figure 6:
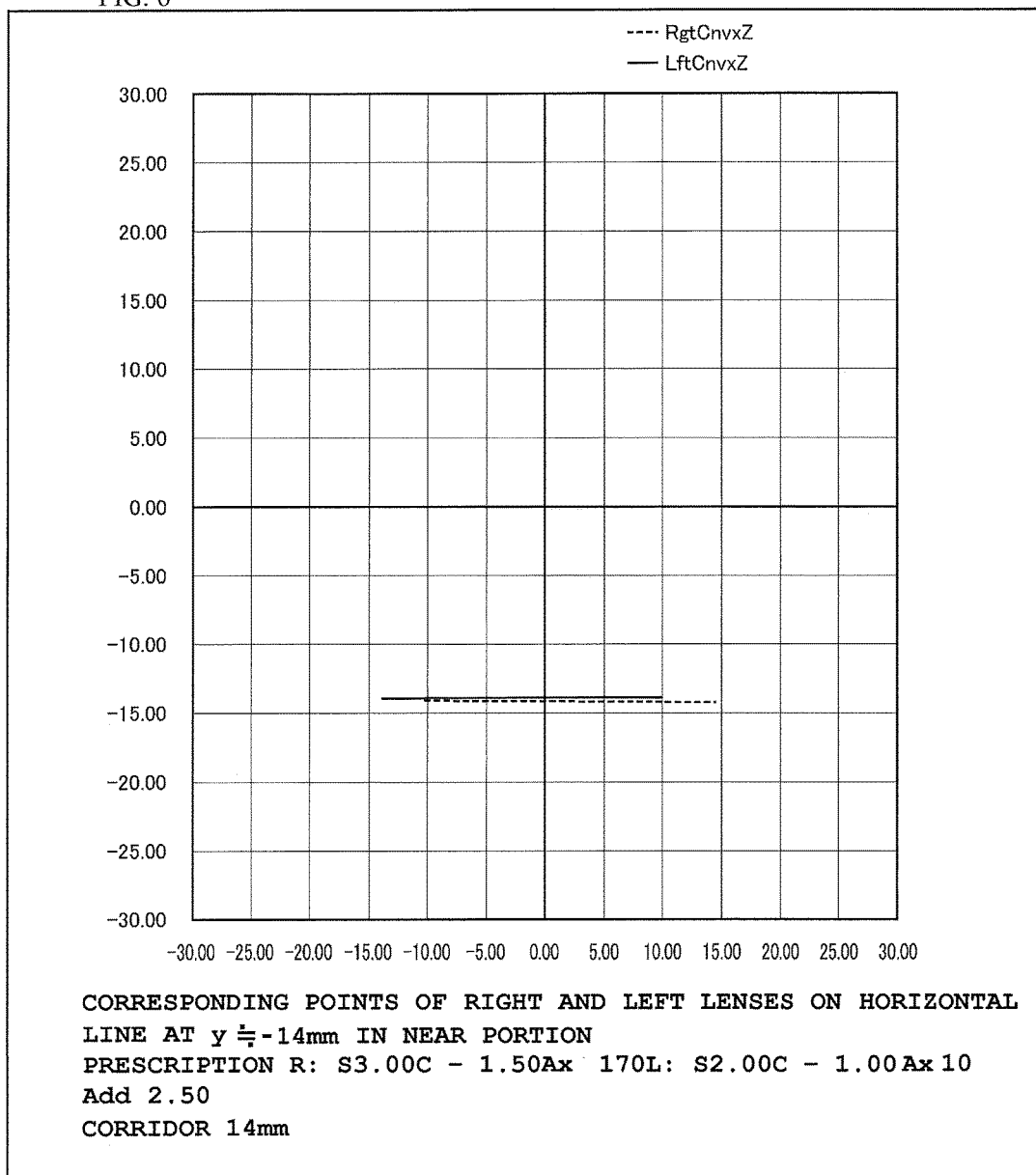
FIG. 6 is an explanatory view showing corresponding points on the right and left lenses respectively.

FIG. 6 is an explanatory view showing the position of the corresponding points on each of the right and left lenses. An example of the figure shows a specific example of the corresponding points on each of the right and left lenses in the horizontal direction in the near vision zone. Note that the lens shown in the figure is based on the same prescription content as that of the lens shown in FIG. 5.

According to the example of the figure, it is found that the corresponding points on the lens are not matched with each other between the lens 1 for a left eye and the lens 2 for a right eye, and a deviation is generated in the horizontal direction and in the vertical direction.

Figure 7:
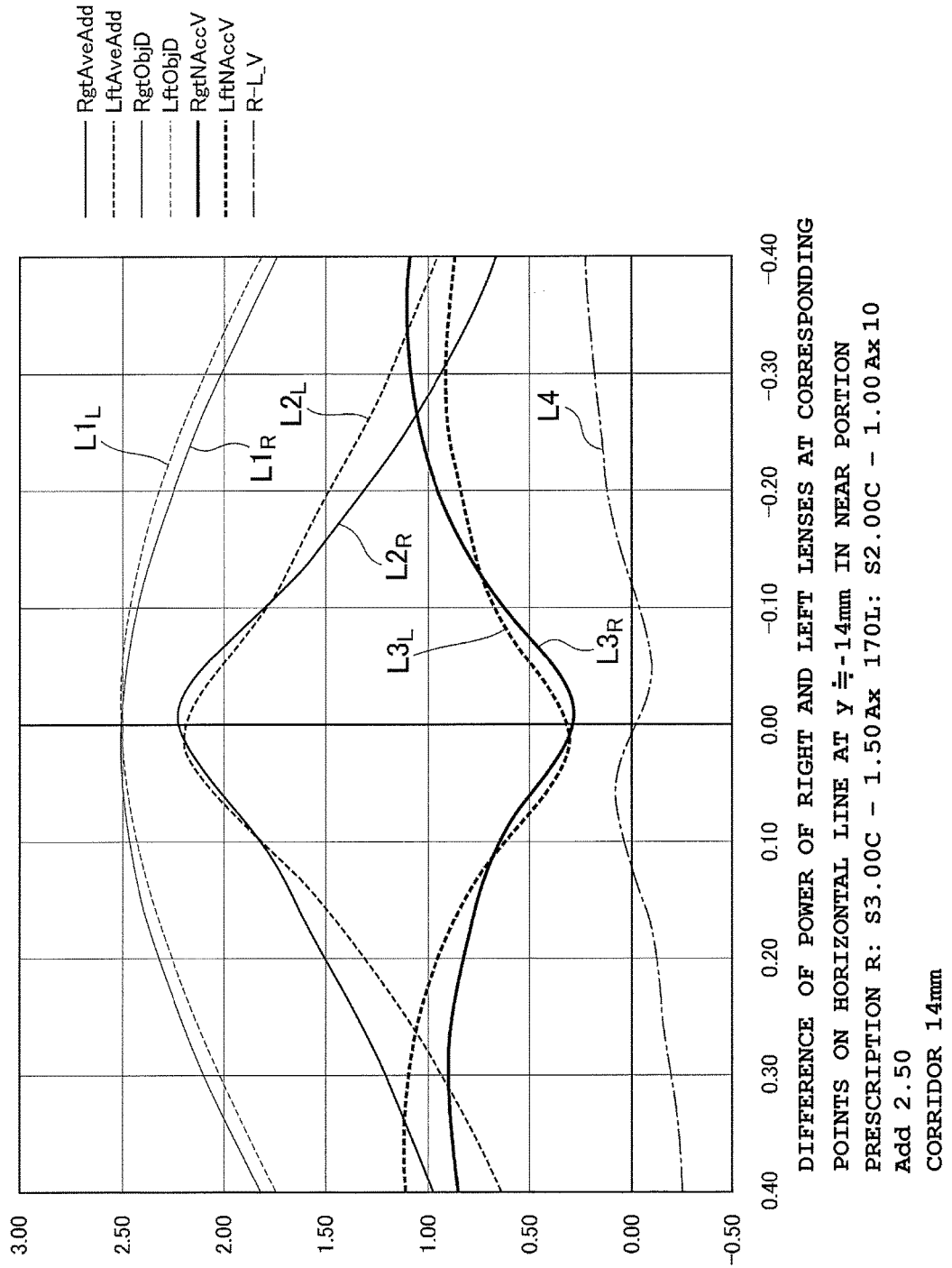
FIG. 7 is an explanatory view showing an accommodation power at the corresponding points on the right and left lenses.
Figure 8:
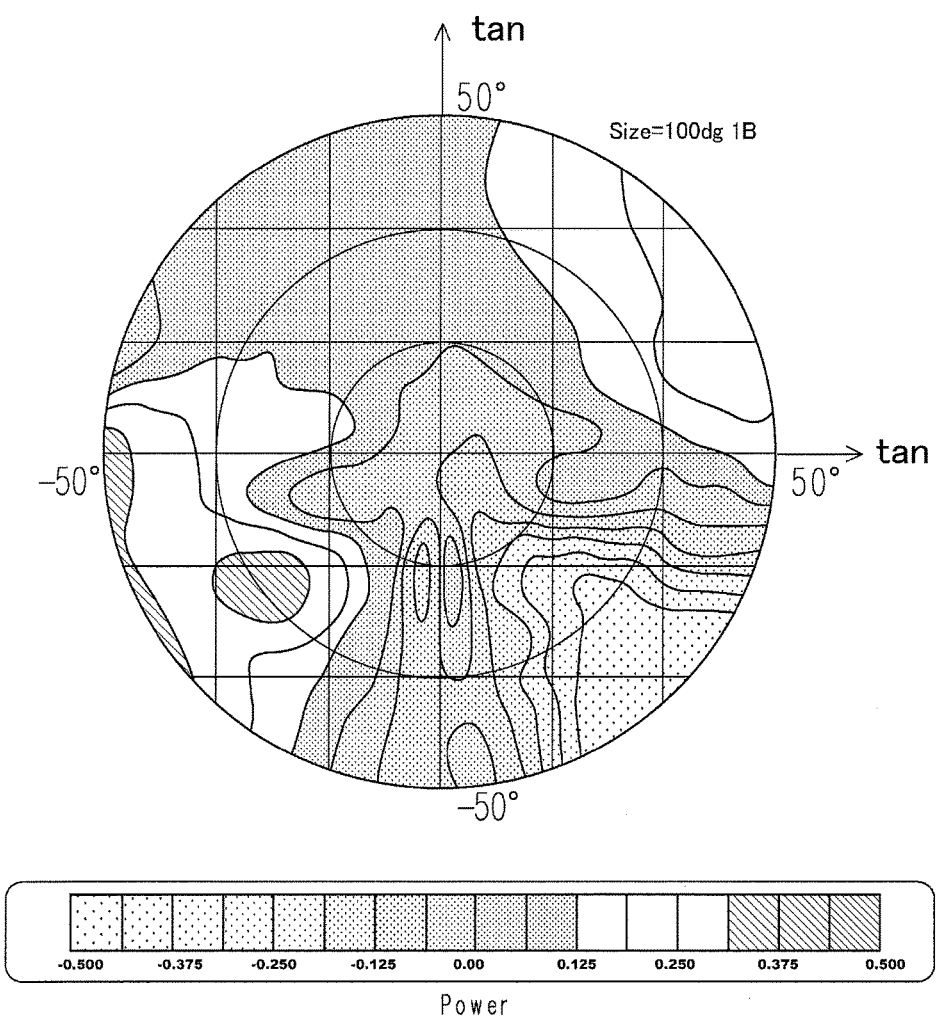
FIG. 8 is a distribution view showing a space distribution of a difference between accommodation powers required for right and left eyes respectively shown in FIG. 7.

When interposing each of the lenses 1 and 2 based on such the conventional lens design, specifically difference as shown in FIG. 7 and FIG. 8 is generated in the accommodation power required for each of the right and left eyes.

FIG. 7 is an explanatory view showing the accommodation power required at the corresponding points on the right and left lenses. The example of the figure shows a specific example of the accommodation power of the right and left eyes through the corresponding points on each of the right and left lenses in the horizontal direction in the near vision zone of the progressive addition lens. The lens shown in the figure is based on the same prescription content as that of the lens shown in FIG. 5 and FIG. 6. Further, in the example of the figure, the required accommodation power is calculated based on the definition of the abovementioned (A).

In the example of the figure, first, the reciprocal value of the distance between the point on the object surface 3 and the lens backside vertex spherical surface, is specified. This is shown by lines $L1_L$ and $L1_R$ in the figure.

Further, in the example of the figure, the average addition power is specified at a ray passing point on the lens directed to each of the right and left eyes from the point on the object surface 3. This is shown by lines $L2_L$ and $L2_R$ in the figure.

Then, the accommodation power required for each of the right and left eyes calculated by ray tracing and formula (A), is shown by lines $L3_L$ and $L3_R$. According to the example of the figure, it is found that this accommodation power is close to L1-L2. Further, according to the example of the figure, lines $L3_L$ and $L3_R$ showing the accommodation power required for each of the right and left eyes are not matched with each other (not overlapped), and are different from each other. This is because the binocular vision state is not taken into consideration in the conventional lens design.

When a difference between accommodation powers required for each of the right and left eyes is calculated, it is shown by line L4 in the figure. According to the example of the figure, the accommodation powers required for each of the right and left eyes are different from each other, and therefore line L4 as well, which shows a difference between the accommodation powers, does now show a straight line without variation, but includes a variation component.

FIG. 8 is a distribution view showing a space distribution of the difference between the accommodation powers required for each of the right and left eyes shown in FIG. 7. The example of the figure shows the accommodation power in an eyeball viewing state in planar view, similarly to the case of FIG. 3.

When there is no difference in the accommodation powers required for the right and left eyes, a uniform pattern concentration (brightness) is supposed to be displayed over the whole surface of the area in the figure. However, according to the example of the figure, it is found that the pattern concentration is non-uniform in the area of the figure, namely, the accommodation power required for each of the right and left eyes is different from each other.

Thus, in the accommodation power calculating step, regarding the previously set point on the object surface 3, the passing points of the light beams on the lens (a pair of corresponding points) directed to the right and left eyeballs from the point on the object surface 3, are specified and the lens power at these points is obtained, and the accommodation power required for focusing on the retina is obtained, and further the difference between right and left is calculated.

(2-4. Power Correcting Step)

After the required accommodation power is calculated, subsequently a power correcting step which is a fourth step is performed. In the power correcting step, the lens power at each point on the lenses 1 and 2, is corrected so that the calculated accommodation powers of the right and left eyes are adjusted.

As described above, when interposing the lenses 1 and 2 based on the conventional lens design in which the binocular vision is not taken into consideration, the accommodation power of each of the right and left eyes can be different from each other, and therefore there is a possibility that the lens wearer feels uncomfortable or feels eye strain when viewing the object in binocular vision. Therefore, in the power correcting step, based on the Hering's Law which is considered to have an influence on the binocular vision, and in order to reduce the inconvenience caused to the binocular vision by the lens wearer, the shape (curvature) of an outer surface or an inner surface or both surfaces of the lens 1 and 2, is modified to correct the lens power at a specific point, in such a manner that the accommodation power required for viewing the point on the object surface 3 coincide with each other between right and left eyes.

It is probable that the passing point of the light beams is varied depending on the modification of the surface shape, and a target modification amount is not necessarily achieved in some cases. However, in such a case, the abovementioned process is performed multiple numbers of times, and the modification amount is selected so as to close to the target.

Here, "coincidence" between the accommodation powers shows that the difference between the accommodation powers required for the right and left eyes, are set within a specific range including "0" (for example, 0.05 D or less).

Namely, the "matching of the accommodation powers" called here includes a case that the accommodation powers are empirically regarded as being almost matched even when they are not completely matched with each other (specifically including the case that the difference between the accommodation powers required for the right and left eyes, is 0.05 D or less for example), other than the case that the accommodation powers required for each of the right and left eyes are matched with each other.

The accommodation powers required for the right and left eyes are made coincide with each other, using a central part of the lens as a target area. For example, as shown in FIG. 4, the "central part of the lens" is the part in a range of 10 mm upper side to 15 mm lower side, from at least a concealed mark position on the lens 1 and lens 2, which is an area 6 in a range of 10 mm right and left from the corridor 4. A concealed mark position 5 on the lens is the position on the lens marked by the concealed mark which is defined by ISO standard and JIS standard, etc.

The difference between the lenses for a right eye and a left eye in a peripheral part of the lens excluding the lens central part (for example, a position away by more than 10 mm from the corridor 4, the upper side of more than 10 mm from the concealed mark position on the lens 1 and lens 2, and the lower side of more than 15 mm from the concealed mark position on the lens), is generally larger than that of the central part of the lens, and it is estimated that other evaluation item (for example, astigmatism) is remarkably deteriorated if the difference between the required accommodation powers is forcibly matched with each other. Accordingly, the difference between the required accommodation powers is allowed to be larger than 0.05 D for example, by loosening the control in the peripheral part of the lens. As a control method, for example, it can be considered that the right and left difference between the required accommodation powers is maximally eliminated so that the astigmatism is not a specific value or more.

Note that the size of the target area given here, namely, the part in a range of 10 mm upper side to 15 mm lower side, from at least a concealed mark position on the lens 1 and lens 2, which is an area in a range of 10 mm right and left from the corridor 4, is simply a specific example. Namely, the size of a control area is considered to be changed, in which the difference between the accommodation powers required for the right and left eyes is controlled to 0.05 D or less.

The method for correcting the lens power for matching the required accommodation powers between right and left eyes, is not particularly limited. Namely, if the required accommodation powers can coincide with each other, both of the lens powers at the corresponding points on the lenses 1 and 2, may be corrected so that the required eyeball accommodation powers are close to each other, or only one of them may be corrected to coincide with the other one.

Thus, in the power correcting step, the power distribution in each of the lenses 1 and 2 is determined by correcting the lens power in at least one of the lens 1 for a left eye and the lens 2 for a right eye, so that the calculated required accommodation powers can coincide with each other between right and left eyes. Thus, in each of the lenses 1 and 2, the lens power at each point on the lenses 1 and 2 is determined so as to have the power distribution in consideration of the binocular vision.

As a result, for example line L4 shown in FIG. 7 for example, is formed as a straight line with almost no variation.

Through the abovementioned series of each step, the lenses 1 and 2 can be designed, in which the lens power distribution is determined in consideration of the binocular vision, namely the inconvenience caused to the binocular vision function of the lens wearer can be reduced.

(2-5. Tool Used for the Lens Design)

The abovementioned series of each step can be performed as a software processing by a computer, using a hardware resource of the computer including a combination of CPU (Central Processing Unit), RAM (Random Access Memory), ROM (Read Only Memory), and HDD (Hard disk drive), etc. Namely, a function (means) for performing a procedure of the lens design described in this embodiment can be realized, by previously installing a software program on the HDD, etc., of the computer for performing the abovementioned series of each step, and causing the CPU, etc., of the computer to perform this software program. In this case, prior to installing the software program on HDD, etc., the software program may be provided to the computer through a communication line, or may be stored in a computer-readable memory medium and provided.

3. Manufacturing Procedure of the Spectacle Lens

A procedure of manufacturing a spectacle lens having a specification obtained by the abovementioned lens design, will be described next.

In manufacturing a spectacle lens, first, a semi-finish lens is prepared as a base material. Then, rough edging is applied to an optical surface of the semi-finish lens, and also grinding and polishing are applied thereto, to thereby finish the surface in a mirror surface state, so as to obtain the distribution of the lens power based on the abovementioned lens design. Thereafter, surface treatment such as dyeing and coating, etc., is performed as needed. Then, edging (bevel edging) is performed so as to fit to the shape of a spectacle frame in which the lens is scheduled to be settled.

By passing through the above-described procedure, the spectacle lens having the distribution of the lens power based on the abovementioned lens design, can be manufactured.

Note that the manufacturing procedure of the spectacle lens given here, is simply a specific example, and a similar spectacle lens can be manufactured as well by other procedure.

4. Structure of the Spectacle Lens

A characteristic structure of the spectacle lens obtained by the abovementioned lens design procedure and lens manufacturing procedure, will be described next.

The spectacle lens obtained in this embodiment has a characteristic structure as described in the following (A) to (D). Specifically, (A) The lens power is set at each point on the lenses 1 and 2, so that the accommodation powers required for each of the right and left eyes, coincide with each other between right and left eyes.

(B) Both of the lens 1 for a left eye and the lens 2 for a right eye are progressive addition lenses.

Further, (C) The difference between the accommodation powers required for each of the right and left eyes is 0.05 D or less, in the range of 10 mm upper side to 15 mm lower side, from at least the concealed mark position on the lens 1 and lens 2, which is the area 6 in the range of 10 mm right and left from the corridor 4.

Further, (D) The lens power is set so as to be simply decreased toward a nose side from a point on the corridor 4, and is increased once toward an ear side from the point on the corridor 4 and thereafter decreased, in at least the near vision zone and the intermediate (progressive) zone.

Thus, the lens power is set, to respond to the movement of an optical ray as shown in FIG. 1 for example. Specifically, when the lens wearer moves the optical ray in a horizontal direction from the median plane, the distance to the point on the object surface 3 is simply increased if the moving direction is directed to the nose side. Therefore, the lens power is set to simply decrease at each point on the lenses 1 and 2. Meanwhile, if the moving direction of the optical ray is directed to the ear side, the distance to the point on the object surface 3 is decreased once and thereafter turns to increase, due to a positional relation between the object surface 3 and each of the right and left eyes. Therefore, the lens power at each point on the lenses 1 and 2 is set to increase once and thereafter decrease.

5. Effect of this Embodiment

According to the spectacle lens, the method for designing a spectacle lens, a method for manufacturing a spectacle lens, and a program used for a lens design, the following effect can be obtained.

In this embodiment, the lens power in each of the lenses 1 and 2 is set so that the accommodation powers required for the right and left eyes coincide with each other, for a pair of the speckle lenses including the lens 1 for a left eye and the lens 2 for a right eye. Namely, the lens 1 for a left eye and the lens 2 for a right eye are considered to be a pair and simultaneously designed, and the lens power is imparted thereto so that the accommodation power required for each of the right and left eyes is matched with each other in the case of the binocular vision. Therefore, according to this embodiment, when the lens wearer views an object in binocular vision through each of the lenses 1 and 2, the image focusing on the retina can be obtained simultaneously by both eyes, and the lens wearer does not feel uncomfortable or eyestrain. Namely, unlike the conventional lens design, the inconvenience caused to the binocular vision function of the lens wearer can be reduced. Therefore, a pair of the spectacle lenses including the lens 1 for a left eye and the lens 2 for a right eye can be suitable for the binocular vision.

Particularly, as described in this embodiment, when the lens 1 for a left eye and the lens 2 for a right eye are the progressive addition lenses, this is extremely useful for the lens wearer. This is because there is a high possibility that the inconvenience is caused to the binocular vision function of the lens wearer, because the conventional progressive addition lens focuses on the suppression of the astigmatism, swing, and distortion, but such an inconvenience can be reduced.

Regarding the progressive addition lens, the corridor 4 is sometimes remarkably different between right and left in the case of responding to an oblique astigmatism and a prism prescription (for example, see FIG. 5). When right and left lenses are designed as a simple body respectively, the inconvenience is probably felt in the case of the binocular vision if such a difference is not coped with. As described in this embodiment, the lens power is set with the virtual object surface 3 as a reference by setting the virtual object surface 3, and specifying the optical ray passing points on the lens corresponding to the point of gaze on the virtual object surface 3, and setting (correcting) the lens power at the corresponding points on the lens so that the accommodation powers required for each of the right and left eyes coincide with each other. Accordingly, a pair of the spectacle lenses can be obtained, which are more improved than the lens designed as a simple body of the right and left lenses respectively, can be obtained.

Further, in this embodiment, the difference between the accommodation powers required for each of the right and left eyes is 0.05 D or less in the range of 10 mm upper side to 15 mm lower side, from at least the concealed mark position on the lens 1 and lens 2, which is the area 6 in the range of 10 mm right and left from the corridor 4. Namely, the coincidence of the accommodation powers required for each of the right and left eyes, is not applied to the whole area on the lenses 1 and 2, but is applied to at least a partial area (specifically the central part of the lens) on the lenses 1 and 2. Therefore, according to this embodiment, there is provided the spectacle lens suitable for the binocular vision in the central part of the lens which is considered to have a great influence on the binocular vision function, and capable of preventing other evaluation item (for example astigmatism) from remarkably deteriorating in the peripheral part of the lens other than the central part of the lens.

6. Modified Example, Etc.

The embodiments of the present invention have been described above. However, the abovementioned disclosure contents are exemplary embodiments. Namely, the technical range of the present invention is not limited to the abovementioned exemplary embodiments.

For example, the abovementioned embodiment gives a case that the lens 1 for a left eye and the lens 2 for aright eye are the progressive addition lenses. However, the present invention can also be applied to other kind of the spectacle lens (for example, a single focus lens). This is because even in the single focus lens, for example if the movement of the optical ray as shown in FIG. 1 is taken into consideration, the accommodation powers are different between right and left eyes, and the inconvenience is sometimes caused to the binocular vision function of the lens wearer.

DESCRIPTION OF SIGNS AND NUMERALS

1 Lens for a left eye
2 Lens for a right eye
3 Object surface
4 Corridor
6 Area

The invention claimed is:

1. A pair of progressive addition lenses comprising:
   a progressive addition lens for a left eye corresponding to the left eye of a lens wearer; and
   a progressive addition lens for a right eye corresponding to the right eye of the lens wearer,
   wherein a lens power of the progressive addition lens for the left eye and a lens power of the progressive addition lens for the right eye are set so that an accommodation power required for the left eye and an accommodation power required for the right eye coincide with each other, when an arbitrary point on a virtual object surface set previously is watched binocularly through the progressive addition lens for the left eye and the progressive addition lens for the right eye,
   the virtual object surface is configured so that a point on the virtual object surface gradually approaches from the distance vision zone corresponding to the infinite distance to the near vision zone in lower side on a median plane, and a point on the virtual object surface becomes a distant point gradually as it goes away in right and left directions from the median plane, when the virtual object surface is viewed from an eyeball side of the lens wearer, the accommodation power required for the left eye is calculated based on a distance from the left eye to the arbitrary point on the virtual object surface, and a lens power at a passing point when an optical ray from the left eye towards the arbitrary point on the virtual optical surface passes through the progressive addition lens for the left eye, and the accommodation power required for the right eye is calculated based on a distance from the right eye to the arbitrary point on the virtual object surface, and a lens power at a passing point when an optical ray from the right eye towards the arbitrary point on the virtual optical surface passes through the progressive addition lens for the right eye.

2. The pair of progressive addition lenses according to claim 1, wherein regarding all corresponding points in at least a range of upper side 10 mm to lower side 15 mm from a lens hidden mark position, and in at least a range of right and left 10 mm from a corridor, the lens power of the progressive addition lens for the left eye and the lens power of the progressive addition lens for the right eye are set so that a difference between the accommodation power required for the left eye and the accommodation power required for the right eye is 0.05 D or less.

3. The pair of progressive addition lenses according to claim 2, wherein regarding a horizontal variation of the lens power of the progressive addition lens for the left eye and the lens power of the progressive addition lens for the right eye in at least a near portion and an intermediate portion, the lens power of the progressive addition lens for the left eye and the lens power of the progressive addition lens for the right eye are set so as to be monotonically decreased toward a nose side from a point on a corridor, and be increased once and thereafter decreased toward an ear side from the point on the corridor.

4. The pair of progressive addition lenses according to claim 1, wherein regarding a horizontal variation of the lens power of the progressive addition lens for the left eye and the lens power of the progressive addition lens for the right eye in at least a near portion and an intermediate portion, the lens power of the progressive addition lens for the left eye and the lens power of the progressive addition lens for the right eye are set so as to be monotonically decreased toward a nose side from a point on a corridor, and be increased once and thereafter decreased toward an ear side from the point on the corridor.

5. A method for designing a pair of progressive addition lenses comprising:

setting a virtual object surface in a visual field viewed through a progressive addition lens for a left eye corresponding to the left eye of a lens wearer and a progressive addition lens for a right eye corresponding to the right eye of the lens wearer, the virtual object surface being configured so that a point on the virtual object surface gradually approaches from the distance vision zone corresponding to the infinite distance to the near vision zone in lower side on a median plane, and a point on the virtual object surface becomes a distant point gradually as it goes away in right and left directions from the median plane, when the virtual object surface is viewed from an eyeball side of the lens wearer;

calculating an accommodation power required for the left eye based on a distance from the left eye to an arbitrary point on the virtual object surface, and a lens power at a passing point when an optical ray from the left eye towards the arbitrary point on the virtual optical surface passes through the progressive addition lens for the left eye, when the arbitrary point on the virtual object surface is watched binocularly through the progressive addition lens for the left eye and the progressive addition lens for the right eye;

calculating an accommodation power required for the right eye based on a distance from the right eye to the arbitrary point on the virtual object surface, and a lens power at a passing point when an optical ray from the right eye towards the arbitrary point on the arbitrary point on the virtual object surface is watched binocularly through the progressive addition lens for the left eye and the progressive addition lens for the right eye; and correcting the lens power in at least one of the progressive addition lens for the left eye and the progressive addition lens for the right eye so that the calculated accommodation power required for the left eye and the calculated accommodation power required for the right eye coincide with each other.

6. A method for manufacturing a pair of progressive addition lenses comprising:

designing the pair of progressive addition lenses having a progressive addition lens for a left eye corresponding to the left eye of a lens wearer and a progressive addition lens for a right eye corresponding to the right eye of the lens wearer; and manufacturing the pair of progressive addition lenses based on a design content in designing the pair of progressive addition lenses, wherein designing the pair of progressive addition lenses comprises:

setting a virtual object surface in a visual field viewed through a progressive addition lens for a left eye corresponding to the left eye of a lens wearer and a progressive addition lens for a right eye corresponding to the right eye of the lens wearer, the virtual object surface being configured so that a point on the virtual object surface gradually approaches from the distance vision zone corresponding to the infinite distance to the near vision zone in lower side on a median plane, and a point on the virtual object surface becomes a distant point gradually as it goes away in right and left directions from the median plane, when the virtual object surface is viewed from an eyeball side of the lens wearer;

calculating an accommodation power required for the left eye based on a distance from the left eye to an arbitrary point on the virtual object surface, and a lens power at a passing point when an optical ray from the left eye towards the arbitrary point on the virtual optical surface passes through the progressive addition lens for the left eye, when the arbitrary point on the virtual object surface is watched binocularly through the progressive addition lens for the left eye and the progressive addition lens for the right eye;

calculating an accommodation power required for the right eye based on a distance from the right eye to the arbitrary point on the virtual object surface, and a lens power at a passing point when an optical ray from the rgiht eye towards the arbitrary point on the arbitrary point on the virtual object surface is watched binocularly through the progressive addition lens for the left eye and the progressive addition lens for the right eye; and correcting the lens power in at least one of the progressive addition lens for the left eye and the progressive addition lens for the right eye so that the calculated accommodation power required for the left eye and the calculated accommodation power required for the right eye coincide with each other.

7. A non-transitory computer-readable storage medium storing a program which makes a computer operate as:

a virtual object surface set unit configured to set a virtual object surface in a visual field viewed through a progressive addition lens for a left eye corresponding to the left eye of a lens wearer and a progressive addition lens for a right eye corresponding to the right eye of the lens wearer, the virtual object surface being configured so that a point on the virtual object surface gradually approaches from the distance vision zone corresponding to the infinite distance to the near vision zone in lower side on a median plane, and a point on the virtual object surface becomes a distant point gradually as it goes away in right and left directions from the median plane, when the virtual object surface is viewed from an eyeball side of the lens wearer;

a first calculate unit configured to calculate an accommodation power required for the left eye based on a distance from the left eye to an arbitrary point on the virtual object surface, and a lens power at a passing point when an optical ray from the left eye towards the arbitrary point on the virtual optical surface passes through the progressive addition lens for the left eye, when the arbitrary point on the virtual object surface is watched binocularly through the progressive addition lens for the left eye and the progressive addition lens for the right eye;

a second calculate unit configured to calculate an accommodation power required for the right eye based on a distance from the right eye to the arbitrary point on the virtual object surface, and a lens power at a passing point when an optical ray from the right eye towards the arbitrary point on the virtual optical surface passes through the progressive addition lens for the right eye, when the arbitrary point on the virtual object surface is watched binocularly through the progressive addition lens for the left eye and the progressive addition lens for the right eye; and a correction unit configured to correct the lens power in at least one of the progressive addition lens for the left eye and the progressive addition lens for the right eye so that the calculated accommodation power required for the left eye and the calculated accommodation power required for the right eye coincide with each other.

* * * * *